US009131637B2

(12) United States Patent
Singh

(10) Patent No.: US 9,131,637 B2
(45) Date of Patent: Sep. 15, 2015

(54) APPARATUS FOR TRANSFERRING LOAD

(76) Inventor: Kalvin Jit Singh, Otorohanga (NZ)

( * ) Notice: Subject to any disclaimer, the term of this patent is extended or adjusted under 35 U.S.C. 154(b) by 464 days.

(21) Appl. No.: 13/392,726

(22) PCT Filed: Aug. 26, 2010

(86) PCT No.: PCT/NZ2010/000167
§ 371 (c)(1),
(2), (4) Date: May 2, 2012

(87) PCT Pub. No.: WO2011/025392
PCT Pub. Date: Mar. 3, 2011

(65) Prior Publication Data
US 2012/0205893 A1   Aug. 16, 2012

(30) Foreign Application Priority Data

Aug. 26, 2009 (NZ) .......................................... 579283
Jun. 10, 2010 (NZ) .......................................... 586062

(51) Int. Cl.
| | | |
|---|---|---|
| A01B 63/14 | (2006.01) | |
| B62D 53/08 | (2006.01) | |
| B60D 1/24 | (2006.01) | |
| B60D 1/54 | (2006.01) | |
| B60D 1/62 | (2006.01) | |
| B62D 49/06 | (2006.01) | |

(52) U.S. Cl.
CPC .............. *A01B 63/145* (2013.01); *B60D 1/246* (2013.01); *B60D 1/247* (2013.01); *B60D 1/54* (2013.01); *B60D 1/62* (2013.01); *B62D 53/08* (2013.01); *B62D 49/065* (2013.01)

(58) Field of Classification Search
CPC ....... B62D 53/08; B62D 49/065; E02F 3/627; A01B 63/145; B60D 1/246; B60D 1/54; B60D 1/62; B60D 1/247
USPC ........................ 280/405.1, 901; 172/439, 272
See application file for complete search history.

(56) References Cited

U.S. PATENT DOCUMENTS

| | | | |
|---|---|---|---|
| 2,779,606 A | | 1/1957 | Weitzel |
| 2,847,231 A | * | 8/1958 | Miller ........................... 280/483 |
| 3,116,074 A | | 12/1963 | Koontz |
| 3,191,963 A | * | 6/1965 | Prichard ...................... 280/81.1 |

(Continued)

FOREIGN PATENT DOCUMENTS

| | | |
|---|---|---|
| DE | 1074982 | 2/1960 |
| DE | 1951405 | 12/1966 |

(Continued)

OTHER PUBLICATIONS

Supplemental Partial European Search Report from corresponding Application No. EP 10 81 2379, dated Oct. 27, 2014.

*Primary Examiner* — Jamie L McGowan
(74) *Attorney, Agent, or Firm* — Greer, Burns & Crain Ltd.

(57) ABSTRACT

An apparatus for transferring load between:
  a) a towing vehicle having front and rear wheels which comprises a tow assembly including a tow bar; and
  b) a towed device which includes a drawbar;
wherein the tow bar and drawbar attach to one another, the apparatus including a shock absorber; and a load transfer mechanism configured for adjustably transferring at least a portion of the load of the towed implement to the front of the vehicle in a region leading the front wheel axle via the shock absorber.

5 Claims, 8 Drawing Sheets

(56) References Cited

U.S. PATENT DOCUMENTS

| | | | |
|---|---|---|---|
| 3,194,584 A | 7/1965 | Reese | |
| 3,284,097 A | 11/1966 | Koontz | |
| 3,436,101 A | 4/1969 | Hanson | |
| 3,534,981 A * | 10/1970 | Moulton | 280/405.1 |
| 3,552,772 A | 1/1971 | Scott | |
| 3,720,427 A * | 3/1973 | Steffe | 280/405.1 |
| 3,870,341 A * | 3/1975 | Younger | 280/423.1 |
| 3,900,119 A * | 8/1975 | Olsen | 414/563 |
| 4,470,211 A | 9/1984 | Rossmann | 37/231 |
| 4,615,130 A * | 10/1986 | Racicot | 37/231 |
| 4,639,008 A * | 1/1987 | Krettenauer et al. | 280/405.1 |
| 4,705,288 A * | 11/1987 | Schmidt | 280/405.1 |
| 4,790,085 A * | 12/1988 | Rossman | 37/231 |
| 5,269,553 A * | 12/1993 | Alonso | 280/402 |
| 5,322,315 A | 6/1994 | Carsten | |
| 5,335,932 A * | 8/1994 | Pierce | 280/788 |
| 5,363,924 A | 11/1994 | Foley et al. | |
| 5,725,231 A | 3/1998 | Buie | |
| 6,178,668 B1 * | 1/2001 | Gustafson et al. | 37/231 |
| 6,519,880 B2 * | 2/2003 | Robitaille | 37/231 |
| 6,533,307 B1 | 3/2003 | Singh | |
| 6,932,555 B2 * | 8/2005 | Dale et al. | 414/607 |
| 7,093,380 B2 * | 8/2006 | Hubscher et al. | 37/231 |
| 7,302,765 B1 * | 12/2007 | Jorgenson et al. | 37/231 |
| 7,654,551 B2 * | 2/2010 | Page | 280/416.1 |
| 7,997,015 B2 * | 8/2011 | Belzile et al. | 37/231 |
| 8,046,938 B1 * | 11/2011 | Jorgenson et al. | 37/231 |
| 2004/0026880 A1 | 2/2004 | Bundy | |

FOREIGN PATENT DOCUMENTS

| | | |
|---|---|---|
| GB | 1087820 | 10/1967 |
| GB | 1239759 | 7/1971 |
| NZ | 330600 | 6/1999 |
| RU | 2 074 598 | 3/1997 |

* cited by examiner

APPARATUS FOR TRANSFERRING LOAD

TECHNICAL FIELD

Apparatus for transferring load between a towing vehicle and a towed device.

BACKGROUND

For ease of reference only the present invention will now be discussed in relation to farm tractors. However, this should not be seen as limiting the scope of the resent invention which has applications to other vehicles and other towing operations.

At present problems are often typically encountered when vehicles such as farm tractors are used for towing device such as above ground working implements including seed drills, scoops, large trailers and cultivating discs. In general, these problems arise due to the tractor and/or towed implement encountering:

Obstructions e.g. rocks
Muddy or wet ground
Hills or hollows

The above situations cause problems as they can adversely affect the traction of the tractor's driving wheels and render the towing of such implements a dead weight dragging operation.

The above difficulties are currently overcome by using tractors which have:

Ballast added; or
Increased horse power/weight; and/or
Four wheel drive; and/or
Dual wheels However, as will be appreciated the above remedies suffer from either increasing the cost of the tractor required to perform the job, or add time and effort to the job in relation to adding ballast to the tractor.

In relation to underground working implements such as ploughs and rotary hoes the above mentioned difficulties for towed implements have been overcome by the implementation of a hydraulic draft control system associated with the three point linkage of a tractor. The draft control system operates by either raising or lowering the implement depending on whether its effective load has been increased or decreased. By this, means the draft control system is able to transfer load (weight) between the implement and tractor to maintain the desired degree of wheel slippage.

The inventor's previous apparatus for addressing these problems is described in U.S. Pat. No. 6,533,307. Whilst this apparatus is very effective at overcoming these difficulties it requires the tractor to have a draft control system which is not always present on many tractors particularly in North America. The present invention therefore allows for the effective transfer of the towed load to the tractor, to avoid or at least significantly reduce, wheel slippage, without the need to utilise a draft control system.

The present invention is also particularly concerned with dispensing with the need for tractors to carry additional ballast sometimes in the order of 1.5-10 tons in order to prevent wheel slippage.

It would therefore be an advantage if there could be provided some means by which the draft control system already present on many tractors could be utilised in the towing of above ground implements also.

It would also be useful if there could be provided a load transfer apparatus and/or method of load transfer which could improve the towing and/or braking ability of road vehicles towing a load.

Further aspects and advantages of the present invention will become apparent from the ensuing description which is given by way of example only.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

It is an object of the present invention to address the foregoing problems or at least to provide the public with a useful choice.

Further aspects and advantages of the present invention will become apparent from the ensuing description which is given by way of example only.

SUMMARY

An apparatus for transferring load between:
a) a towing vehicle having front and rear wheels which comprises a tow assembly which includes a tow bar; and
b) a towed device which includes a drawbar;
wherein the tow bar and drawbar attach to one another and wherein the apparatus includes a shock absorber;
characterised in that the apparatus also includes a load transfer mechanism configured for adjustably transferring at least a portion of the load of the towed implement to the front of the vehicle in a region leading the front wheel axle via the shock absorber.

A method of towing an implement which is characterised by the step of:
a) attaching a towed implement to the front of a vehicle in a manner which:
allows the towed vehicle to be towed behind the vehicle when the vehicle is moving in a forward direction; and
adjustably transfers at least a portion of the towed load to the front end of the vehicle whilst being towed and only a portion of the towed load to the rear of the vehicle.

The towing vehicle may be any vehicle capable of towing a device.

In one preferred embodiments the vehicle may be a four wheel drive tractor.

In another preferred embodiment the vehicle may be a tractor such as a truck or lorry.

In a further preferred embodiment the vehicle may be a car.

The towed implement may be any device which is designed to be pulled by a vehicle.

The towed implement may be dragged or may include wheels or other form of carriage assembly to enable the implement to be conveyed through the towing action of a vehicle.

For ease of reference only the present invention will now generally be described in relation to a farm tractor and a towed agricultural implement.

The load transfer mechanism may preferably be in the form of at least one linkage between the drawbar and a connection point at the front end of the tractor.

In preferred embodiments there may be a primary linkage connecting the drawbar to the front of the tractor and a secondary linkage connecting the drawbar to the rear of the tractor at a point which is higher that that of the rear axle.

The amount of towed load to be transferred will be dependent on what is being towed and what the geography/conditions are where the towing is to occur. For example, on a flat field; where a farm tractor is towing an ground working implement this will produce a 50:50 bias on the tow bar, it is desirable to have a larger percentage of load transferred to the back of the tractor rather than to the front of the tractor. As the rear wheels are doing the lions share of the work during a towing operation so less load needs to be transferred to the front wheels.

In other words, as would be understood by a person skilled in the art, the purpose of front ballast weight in prior art towing operations, is to act as a counterweight. Therefore, it is important to understand the operation of the present invention to produce a similar net result to adding ballast (i.e. transferring a load to the front wheels) does not take weight from the front of the tractor, to give the back, should the back of the tractor require additional load for the rear wheels. Instead, the object is transfer towed load to the front of the tractor, to maintain the necessary downward load on the front wheels, as required. The amount to be transferred to the front of the tractor can be assessed in the same manner as one currently assesses how much ballast needs to be added to the front of the tractor.

The present invention is more efficient in transferring the towed load to the rear wheels of the tractor due to the drawbar of the towed implement being coupled to the rear of the tractor at point above the rear axle of the tractor and as result above the centre of gravity of the tractor in this region. The transfer of the towed load to a point of the tractor above the centre of gravity creates downwardly vectored load onto the rear wheels.

The inventor has found that if you have the present invention utilised on a tractor having a draft force of 12 ton pulling 12 ton load the drawbar pin during a normal towing operation is neutral. As the towed load forces are above the centre of gravity at both ends of the tractor such that the harder the tractor pulls the more it pulls weight onto driving wheels of the tractor. Thus, as the present invention uses static force and not hydraulic pressure to transfer the towed load to the wheels of the tractor, it is not having to use fuel to transfer load, so there is no consequential reduction in the performance of the tractor's engine.

The amount of the towed load that is transferred to the front of the tractor may be adjusted a variety of different ways. In general it may be achieved by adjusting the tensioning force that is applied to the load transfer mechanism by the shock absorber prior to commencing a towing operation.

The towed implement can include but should not be limited to:
 Trailers;
 Ground scrapers;
 Ploughs;
 Seed hoppers;
 Irrigation systems;
 Bailing equipment.

The tow bar may have a number of different configurations without departing from the scope of the present invention.

In one preferred embodiment the tow bar may be a standard tow bar as factory fitted or commonly retrofitted to tractors for towing vehicles.

In another preferred embodiment of the tow assembly the tow bar may include a shock absorber and may be configured to allow for limited travel in a forward and backward direction with respect to the longitudinal axis of the vehicle. This limited travel of the tow bar being capable, in use, of transferring at least a portion of the load of the towed implement, to the front of the tractor in a region leading the front wheel axle.

In some such embodiments the tow bar may be housed within a sleeve or such like and may include a set of wheels/rollers either on the tow bar or within the sleeve on which the tow bar may ride. Most preferably the sleeve may include a boss which acts as a stop to prevent the tow bar from being pulled from the sleeve.

In some preferred embodiments the tow bar may include a connecting portion to which one end of a primary linkage is directly or indirectly attached. In such embodiments the other end of the primary linkage may be attached to the shock absorber.

In another preferred embodiment the tow bar may include a pulley arrangement and this interacts with the primary linkage.

In some preferred embodiments, the drawbar may be a standard drawbar which is modified s described herein.

Alternatively the drawbar may be custom made so as to be capable of being used with the present invention.

In preferred embodiments the drawbar may be a standard draw bar which has not been modified.

In general the tow bar and the drawbar may be attached to one another by a hitch pin which passes through aligned apertures present in the tow bar and drawbar.

The shock absorber may be any device which is capable of absorbing energy of sudden impulses caused by kinetic energy.

In some preferred embodiments the shock absorber may be in the form of a spring. In a preferred embodiment the shook absorber may be in the form of a leaf spring.

In other embodiments the shock absorber may be in the form of a gas ram. In some preferred embodiments the shock absorber may be a dual liquid/gas ram.

The load transfer mechanism may be configured to transfer load via a shock absorber to the front of the tractor in a number of different ways.

In general the shock absorber may be indirectly connected to the drawbar of the implement in any manner which enables the shock absorber to absorb energy caused by alterations in the normal load experienced by the tractor or towed implement towing relationship, such as for example would be caused by changes in terrain, during towing.

In some embodiments the shock absorber may be connected at one end thereof to the rear of the tractor and connected to the second linkage via a conveyor linkage at the other end thereof. The conveyor linkage also being connected to the primary linkage. The conveyor linkage effectively connects the drawbar to the rear of the tractor at a point above that of the rear axle. The conveyor linkage also acts to convey shock forces to the shock absorber.

In preferred embodiments the shock absorber may be connected at one end thereof to the front of the tractor and to the primary linkage at the other end thereof.

The primary and secondary linkages may come in a variety of different forms with out departing from the scope of the present invention.

In some embodiments the primary and secondary linkage may be in the form of a rods or such like.

In some other embodiments the primary, secondary and conveyor linkage may be in the form of a length of material. For example only the length of material may be a cable or such like.

In preferred embodiments the primary, secondary and conveyor linkages may be in the form of chains. An advantage of chains is that they can be certified to be capable of withstanding various loadings.

It will be appreciated that the form of the primary, secondary, and conveyor linkages may be the same or may be different without departing from the scope of the present invention.

According to a further aspect there is provided a towing vehicle which includes an apparatus for transferring load substantially as described above.

According to a further aspect there is provided a towing vehicle which transfers load from a towed device to the towing vehicle via a method substantially as described above.

According to a further aspect of the present invention, there is provided a tow assembly substantially as described above wherein the tow bar is adapted, in use, to be connected to three point linkage arms of a tractor and wherein a hydraulic ram associated with said three point linkage arms in fluidly connected to a nitrogen accumulator.

The term 'fluidly connected' refers to the hydraulic fluid of the ram being connected to a nitrogen accumulator. This allows the hydraulic ram to lower the three point linkage arms should a pre-set pressure in the accumulator be exceeded, by the oil pressure of the hydraulic rams as in this situation oil from the ram can enter the accumulator.

In a preferred embodiment the tow bar may be adapted to connect to the three point linkage by the inclusion of at least one bell crank configured to be connected to the three point linkages arms via a cable.

Thus, preferred embodiments of the present invention may include one or more of the following advantages:
  allowing the tractor with or without a draft control system to have the load of the towed implement be spread across all four wheels to eliminate or significantly reduce the need for additional weight to be carried by the tractor.
  Significantly improving the fuel efficiency of the tractor as the need to carry excessive additional weight in the form of ballast is removed.
  The present invention can also be used to increase the traction of road vehicles towing a load, particularly on hills or in wet or slippery conditions. This also allows the front brakes of a vehicle to better assist with braking a vehicle towing a load.

BRIEF DESCRIPTION OF DRAWINGS

Further aspects of the present invention will become apparent from the following description which is given by way of example only and with reference to the accompanying drawings in which.

DETAILED DESCRIPTION

Figure 1:
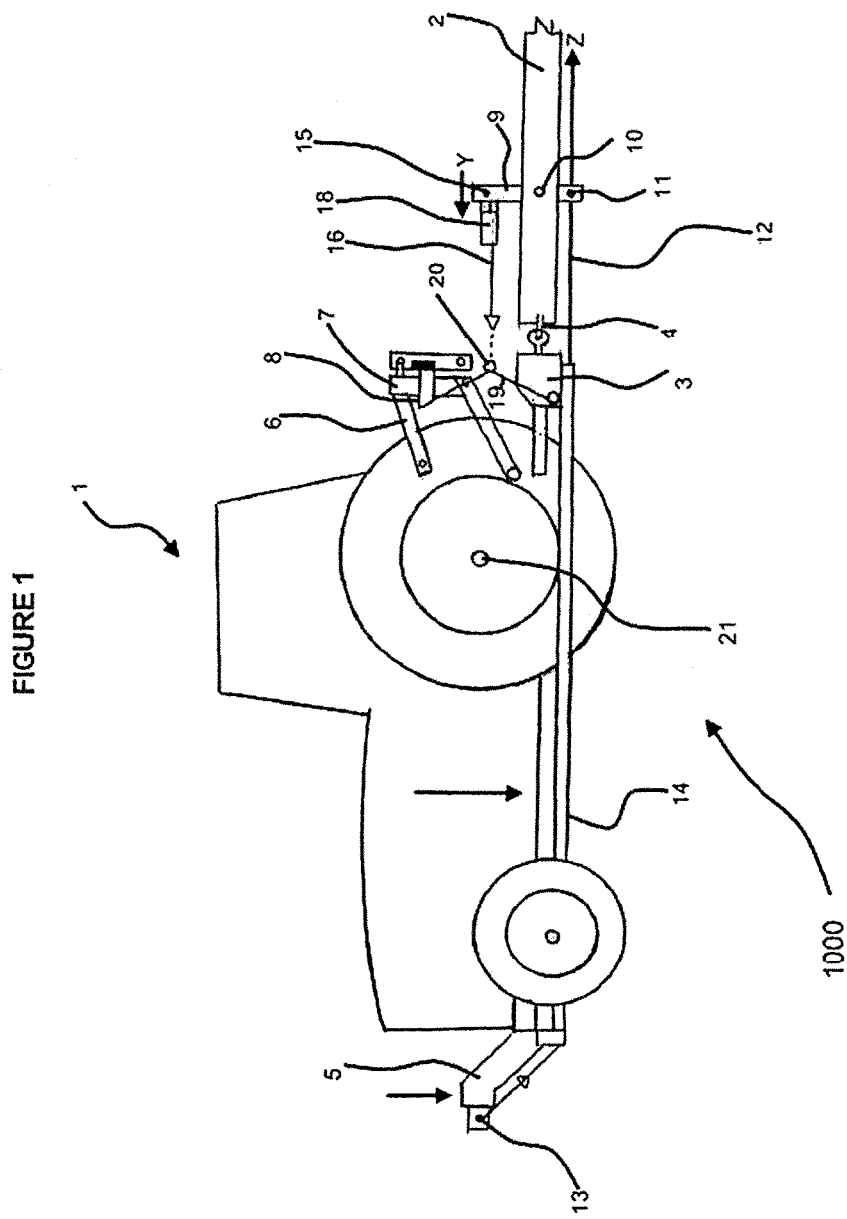
FIG. 1 is a diagrammatic side view of one preferred embodiment of the present invention.

With respect to FIG. 1 there is provided a tractor (1) which has a load transfer apparatus generally indicated by arrow (1000) and a towed implement in the form of a ripper or seed drills (not shown) which has a drawbar (2) at the front thereof. The tractor has a tow bar (3) connected to the drawbar (2) via a hitch pin (4). At the front of the tractor (1) there is a weight frame (5).

Attached to the three point linkage arms (6) of the tractor is a mounting-framework (7) which has a shock absorber in the form of two 10 ton leaf springs (8) (of which only one is shown) connected thereto.

The drawbar (2) has a pivot arm (9) pivotally connected thereto at a pivot point (10). The bottom end of the pivot arm (9) is bolted at (11) to one end of a primary linkage in the form of a chain (12) certified to loading depending on the weight of the tractor/towed load the other end of the primary linkage is bolted at (13) to the weight frame (5) at the front of the tractor (1). The chain (12) is partially encased by a length of steel pipe (14) which acts as a brace which supports the front of the tractor by the rear tow bar (3). The top end of the pivot arm (9) is bolted at (15) to a pulley (18) through which the secondary linkage in the form of a length of cable/chain (16) passes. The ends of cable/chain (16) are attached via bolts (not shown) to the distal ends of the two leaf springs (8) (of which only one can been seen). The distal ends of the leaf spring (8) are located above the height of the tractor's rear axle (21).

In use the pivot arm (9) is able to pivot about the axis (10) in direction Z to transfer load to the front of the tractor. Should the tractor go up a hill the pivot arm (9) pivots in the opposite direction Y to transfer more load to the leaf springs (8) and rear of the tractor. As will be understood the load transfer mechanism of the present invention allows for the vectoring of force from the front of the vehicle to the rear of the vehicle when an implement is being towed. Ideally the force (load) of the towed implement is vectored through or near the centre of gravity of the tractor (1).

Figure 2:
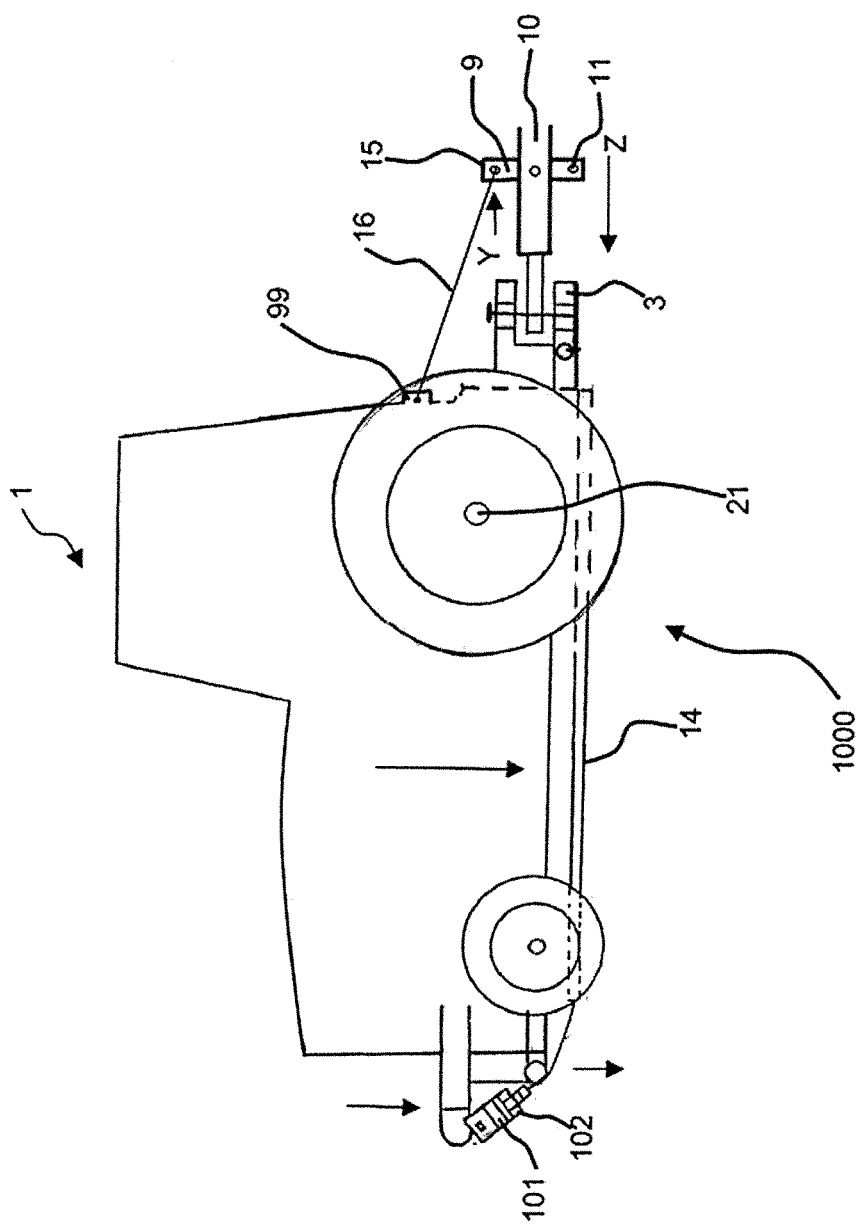
FIG. 2 is a diagrammatic side view of another preferred embodiment of the present invention.

In FIG. 2 like reference numerals have been used to indicate like elements and thus the discussion of the embodiment in FIG. 2 will be limited to the differences over the embodiment depicted in FIG. 1. The key differences in this embodiment is that the tractor (1) does not have a three-point linkage and thus the chain/cable (16) is attached directly to the rear of the tractor (1) at a point (99) which is above the height of the rear axle (21) of the tractor. Instead in this embodiment the shock absorber is in the form of a dual liquid/gas cylinder (nitrogen accumulator) (100), in this case hydraulic oil is on one side (101) of the piston (not shown) and nitrogen is on the other (102). The shock absorber (100) is also located at the front of the tractor and has the piston's rod attached to the chain (12). The oil side of the piston is upstream of the towed implement and the nitrogen is downstream, such that in use, the load of the towed vehicle, is transferred along chain (12) to pull against and compress the gas in the cylinder (100).

In both the embodiments in FIGS. 1 and 2 tension is applied to the load transfer mechanism by the biasing force of the shock absorber, which is adjusted to transfer the desired amount of load from the towed implement to the front of the tractor. For example this can be achieved by having more or less nitrogen in the cylinder, or by adjusting the three point linkage. To unhitch the towed implement after towing where there is a shock absorber (100) hydraulic oil is used to move the piston so as force gas out of the cylinder to relieve the tension applied to the load transfer mechanism to allow for detachment.

Figure 3:
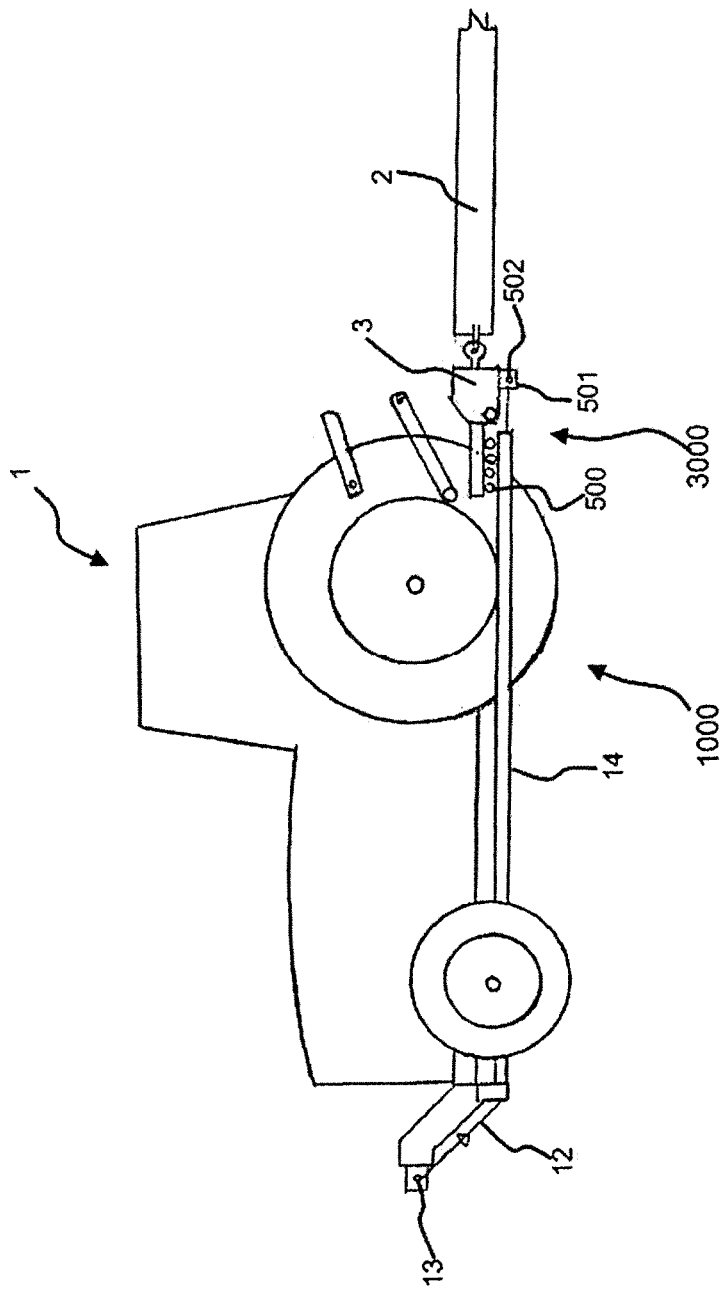
FIG. 3 shows a diagrammatic side view of an alternate preferred embodiment of the present invention.
Figure 4:
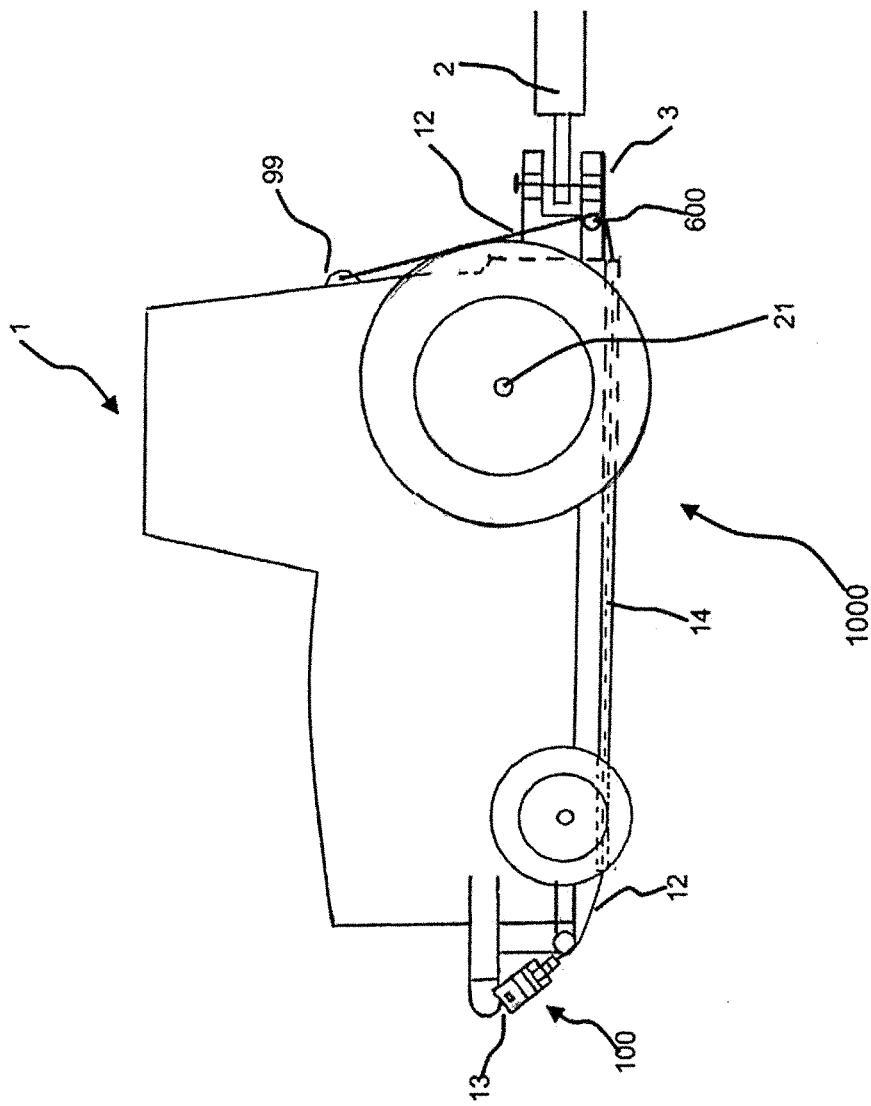
FIG. 4 shows a diagrammatic side view of a still further preferred embodiment of the present invention.

In FIGS. 3 and 4 like reference numerals will be used to describe like elements from FIGS. 1 and 2 and the following description relates to the differences of these preferred embodiments over those in FIGS. 1 and 2.

Figure 5:
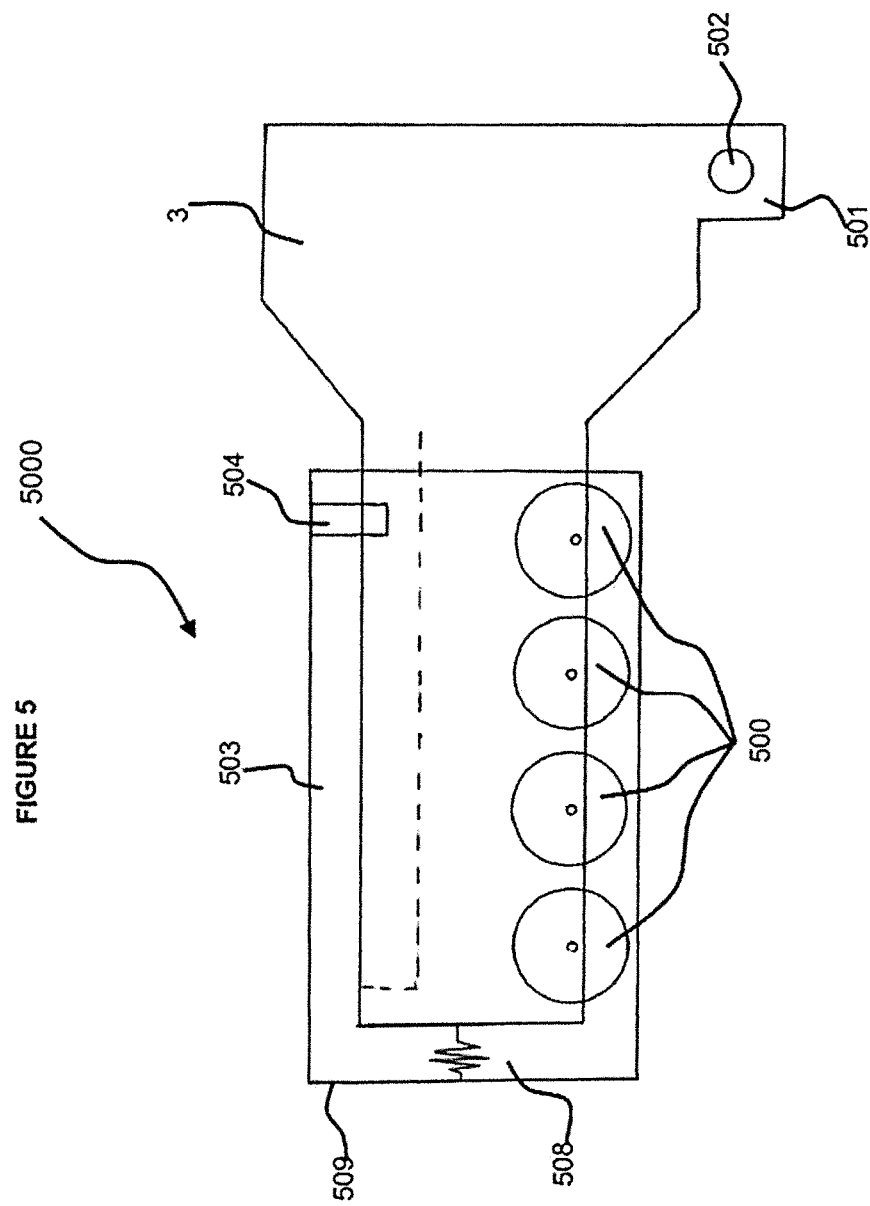
FIG. 5 shows a modified tow assembly of the embodiment shown in FIG. 3.

FIG. 3 which is a variant of the embodiment in FIG. 1 has a tow assembly generally indicated by arrow (3000) the tow bar (3) has been modified (customised) to have a set of wheels (500) and a connecting portion in the form a projection (501) and aperture (502)—(see also FIG. 5). The tow bar (3,) of the tow assembly (5000), fits within a sleeve (503) (shown in FIG. 5) which has a' boss pin (504). The sleeve (503) is welded to the chassis of the tractor (not shown). The tow bar has a forward nose portion (505) which has a groove (506) into which the boss pin (504) locates. The forward end of the groove (506) has a wall against which the boss pin abuts to prevent the tow bar being pulled from the sleeve. It will be appreciated that the boss pin is shaped/dimensioned, and made from high tensile steel as is the sleeve, so as to be capable of supporting if need be the draft load from the towed implement. In most cases the majority of the load will be taken by the shock absorber.

The aperture (502) of projection (501) is connected via a D-shackle (not shown) to one end of chain (12). The forward nose end of the tow bar (3) is connected via a shock absorber in the form of a compression spring (508) fixed to the end wall (509) of sleeve (503).

In FIG. 4 which is a variant of the embodiment shown in FIG. 2 the tow bar (3) "floats" via wheels within a sleeve (both not shown) in a similar manner to that described for FIG. 3 with the exception that no compression spring is required to connect the tow bar to the end wall of the sleeve. This is because this embodiment already has a shock absorber (100). In this embodiment one end of the chain (12) is connected to the rear of the tractor at point (99). The chain passes through a pulley (600) on tow bar (3) as it is redirected to point (99).

As can be seen the "floating tow bar" arrangements of FIGS. 3 and 4 enable the towed load to be transferred to the front of the vehicle via chain (12).

Figure 6:
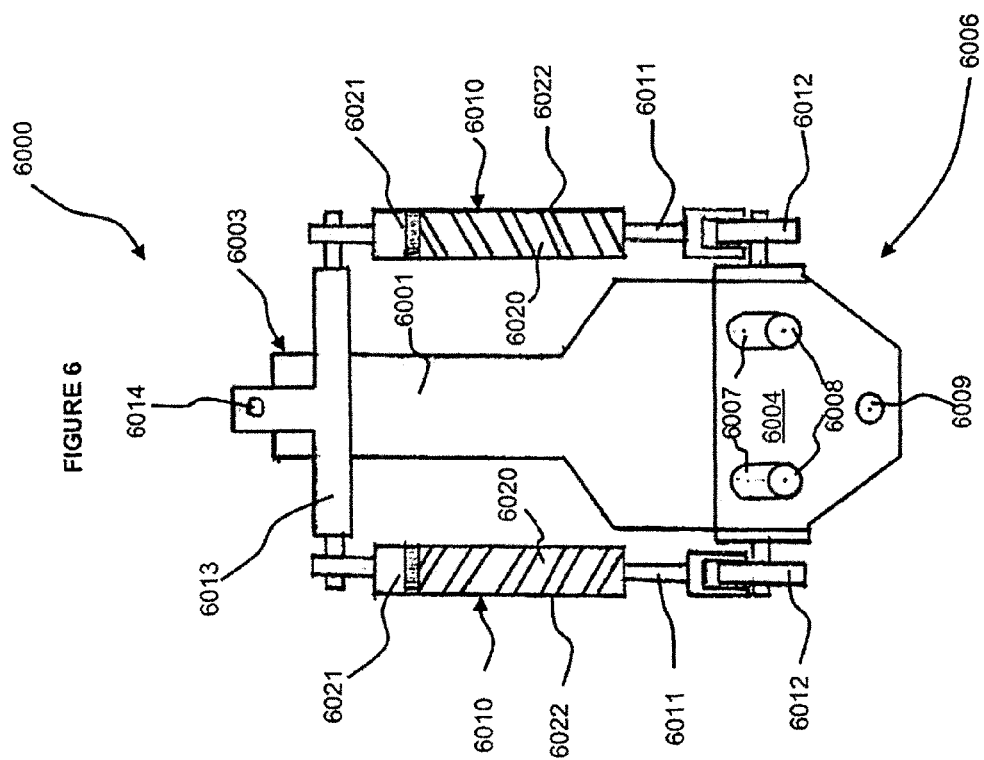
FIG. 6 shows a modified tow assembly in accordance with a further preferred embodiment.
Figure 7:
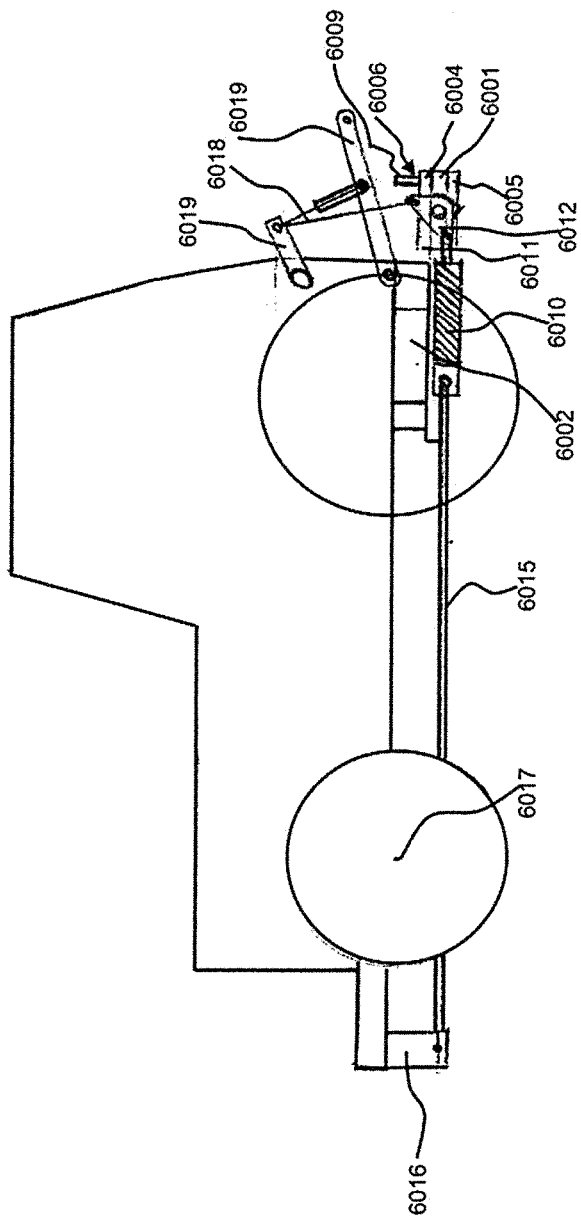
FIG. 7 shows a diagrammatic side view of another, further preferred embodiment of the present invention.

In FIGS. 6 and 7 there is shown a tow assembly generally indicated by arrow (6000). The tow assembly has a base plate (6001) which is bolted to the tractor chassis (6002) (shown in FIG. 7) at a front end thereof (6003). The tow bar assembly (6000) also has top and bottom plates (6004) and (6005) respectively which are connected via side plates (not shown) which form a tow bar (6006). The top plate (6004) has two slots (6007) which receive boss pins (6008) which prevent the top and bottom plates (6004) and (6005) from being pulled off the base plate (6001). The top and bottom plates (6004) and (6005) have a draw bar pin (6009) which hitches to the draw bar of a towed implement (not shown).

The tow bar assembly (6000) also has two shock absorbers in the form of spring loaded oil filled shock absorber cylinders (6010) which have a piston arm (6011) extending from one end thereof and which is pivotally attached to a bell crank (6012). The bell crank (6012) is itself pivotally attached at one end to the side plates (6005). The opposite end of shock absorber cylinders (6010) is attached to a T-frame member (6013) which connects the two shock absorbers to one another. The T-frame member has an aperture (6014) which in, use is connected to one end of a primary linkage in the form of a chain (6015). The opposite end of chain (6015) is connected to a chassis connector member (6016) on the tractor. As can be seen the tractor connector member connects to the chassis at a point above the front axle (6017) of the tractor.

The opposite end of the bell crank (6012) is attached via a cable (6018) to the ends of the tractors hydraulic linkage arms (6019).

In use, lifting the linkage arms (6019) allows a user to adjust what proportion of the towed load is transferred to the front of the tractor. Additionally lifting the linkage arms also allows some of the downwards force created by the weight of the towed implement to be taken off the draw bar hitch pin (6009). That is the hydraulic linkage arms bear some of the load (i.e. a portion of the downward force is transferred thereto).

The shock absorbers (6010) have a spring (6020) against which the piston (6021) compresses when a towed load is applied to the tow bar. The piston (6021) has a plurality of small apertures therethrough (not shown) through which oil must pass in order for the piston to travel within the cylinder (6022) of the shock absorber.

Figure 8:
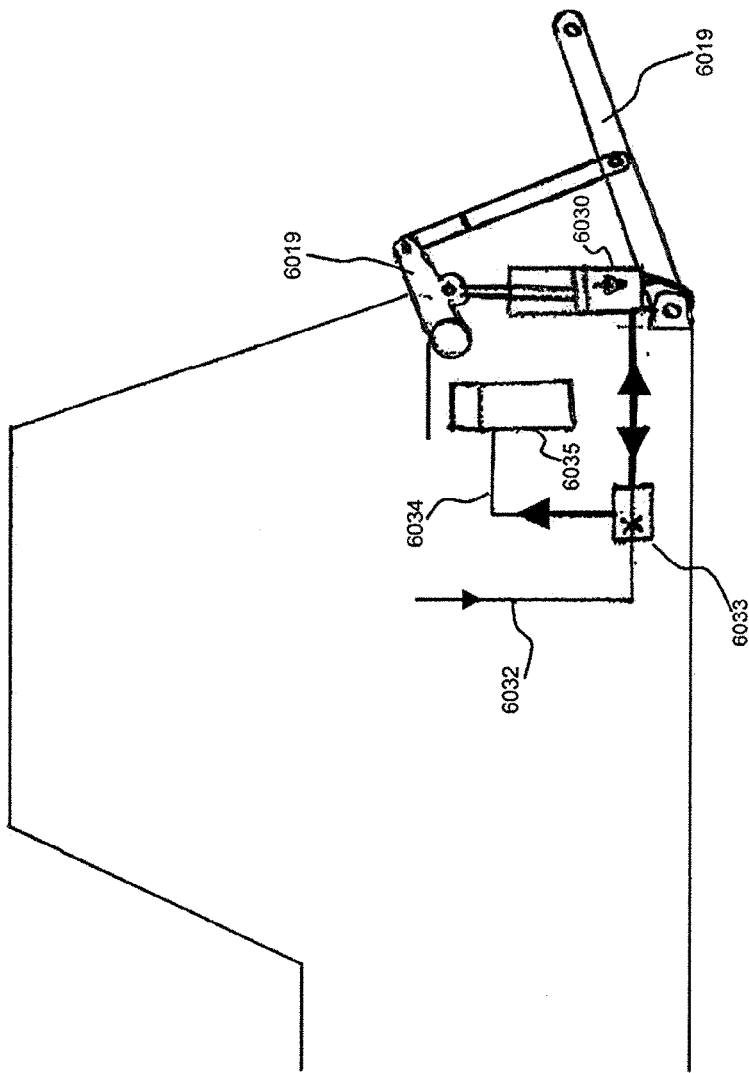
FIG. 8 shows a diagrammatic side view of a preferred form of additional shock absorber which can be utilised with the embodiment shown in FIG. 7.

With respect to FIG. 8 there is shown the linkage arms (6019) which are moved (i.e. lifted or lowered) via the three point hitch hydraulic ram (6030). The three point hitch ram (6030) is connected to the hydraulic oil of the tractor via a supply line (6032) which has been modified to include therein a diverter valve (6033) which has a diverter line (6034) which is connected to a nitrogen accumulator (6035). This set up allows for any jolts or other shocks experienced by the three point hitch ram (6030), such as may occur as a result of undulating ground to be absorbed by the compressible nitrogen gas in the nitrogen accumulator (6035). Thus this set up converts the rigid hydraulic system of a tractor to a flexible hydraulic system.

Aspects of the present invention have been described by way of example only and it should be appreciated that modifications and additions may be made thereto without departing from the scope of the appended claims.

What I claim is:

1. An apparatus for transferring load between:
   a) a towing vehicle having a front end and a rear end respectively with front and rear wheels, wherein the towing vehicle comprises a tow assembly including a tow bar at the rear end; and
   b) a towed device which includes a drawbar at the front end;
   wherein the tow bar and drawbar are attached to one another, the apparatus comprising:
   a shock absorber; and
   a load transfer mechanism configured for adjustably transferring at least a portion of the load, via the tow bar and draw bar connection, of the towed implement to the front of the vehicle in a region leading the front wheel axle via the shock absorber.

2. The apparatus for transferring load as claimed in claim 1 wherein the load transfer mechanism is in the form of at least one linkage between the drawbar and a connection point at the front end of the tractor.

3. The apparatus for transferring load as claimed in claim 1 wherein the load transfer mechanism is a primary linkage connecting the drawbar to the front of the tractor, and a secondary linkage connecting the drawbar to the rear of the tractor at a point which is higher than that of the rear axle.

4. The apparatus for transferring load as claimed in claim 3 wherein the tow bar includes a pulley arrangement and said pulley arrangement interacts with the primary linkage.

5. A towing vehicle which includes an apparatus for transferring load as claimed in claim 1.

\* \* \* \* \*